United States Patent
Ren

(10) Patent No.: US 12,361,704 B2
(45) Date of Patent: Jul. 15, 2025

(54) IMAGE DETECTION METHOD AND APPARATUS, COMPUTER DEVICE, AND COMPUTER-READABLE STORAGE MEDIUM

(71) Applicant: Tencent Technology (Shenzhen) Company Limited, Shenzhen (CN)

(72) Inventor: Mingxing Ren, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 401 days.

(21) Appl. No.: 17/901,707

(22) Filed: Sep. 1, 2022

(65) Prior Publication Data
US 2022/0415038 A1    Dec. 29, 2022

Related U.S. Application Data

(63) Continuation of application No. PCT/CN2021/113175, filed on Aug. 18, 2021.

(30) Foreign Application Priority Data

Sep. 25, 2020  (CN) .......................... 202011024483.0

(51) Int. Cl.
*G06V 10/98*    (2022.01)
*G06T 5/70*    (2024.01)
(Continued)

(52) U.S. Cl.
CPC ................ *G06V 10/98* (2022.01); *G06T 5/70* (2024.01); *G06T 7/0002* (2013.01); *G06V 10/75* (2022.01)

(58) Field of Classification Search
CPC ........ G06V 10/98; G06V 10/40; G06V 10/75; G06T 5/70; G06T 5/73; G06T 7/0002; G06T 7/174; G06T 2207/10016
See application file for complete search history.

(56) References Cited

U.S. PATENT DOCUMENTS

| 8,564,669 B2 * | 10/2013 | Seigneurbieux ....... H04N 19/85 348/180 |
| 9,412,030 B2 * | 8/2016 | Bocharov ................. G06T 5/70 |

(Continued)

FOREIGN PATENT DOCUMENTS

| CN | 102547301 A | 7/2012 |
| CN | 103810106 A | 5/2014 |

(Continued)

OTHER PUBLICATIONS

Tencent Technology, EESR, EP Application No. 21871145.5, Oct. 19, 2023, 11 pgs.

(Continued)

*Primary Examiner* — Sumati Lefkowitz
*Assistant Examiner* — Michael Adam Shariff
(74) *Attorney, Agent, or Firm* — Morgan, Lewis & Bockius LLP

(57) ABSTRACT

The present application provides an image detection method performed by a server. The method includes: intercepting a first image and a second image at a preset time interval from a video stream; performing pixel matching on the first image and the second image to obtain a value of total matching pixels between the first image and the second image; performing picture content detection on the second image in response to determining that the value of total matching pixels between the first image and the second image satisfies a preset matching condition based on the value of total matching pixels; and determining that the video stream is abnormal in response to determining that no picture content is in the second image by the picture content detection. In this way, an image recognition manner can be used to perform detection on image pictures of the video stream at the preset time interval.

20 Claims, 5 Drawing Sheets

(51) Int. Cl.
*G06T 7/00* (2017.01)
*G06V 10/75* (2022.01)

(56) References Cited

U.S. PATENT DOCUMENTS

| | | | | |
|---|---|---|---|---|
| 10,171,763 | B2 * | 1/2019 | Johansson | ............... G06T 5/20 |
| 2019/0273925 | A1 | 9/2019 | Babbar et al. | |

FOREIGN PATENT DOCUMENTS

| | | | |
|---|---|---|---|
| CN | 104166614 | A | 11/2014 |
| CN | 105872760 | A * | 8/2016 |
| CN | 106375755 | A | 2/2017 |
| CN | 106599783 | A | 4/2017 |
| CN | 107509107 | A | 12/2017 |
| CN | 107657591 | A | 2/2018 |
| CN | 109062651 | A | 12/2018 |
| CN | 109766953 | A | 5/2019 |
| CN | 109996063 | A | 7/2019 |
| CN | 111654756 | A | 9/2020 |
| CN | 112206508 | A | 1/2021 |
| JP | 2003108051 | A | 4/2003 |
| JP | 2010056729 | A | 3/2010 |
| JP | 2011165007 | A | 8/2011 |
| JP | 2011215716 | A | 10/2011 |
| KR | 100981147 | B1 * | 9/2010 |

OTHER PUBLICATIONS

M.B. Hisham et al., "Template Matching Using Sum of Squared Difference and Normalized Cross Correlation", IEEE Student Conference on Research and Development, Dec. 2015, 5 pgs.

Tencent Technology, WO, PCT/CN2021/113175, Nov. 17, 2021, 5 pgs.

Tencent Technology, IPRP, PCT/CN2021/113175, Mar. 28, 2023, 6 pgs.

Tencent Technology, ISR, PCT/CN2021/113175, Nov. 17, 2021, 3 pgs.

* cited by examiner

IMAGE DETECTION METHOD AND APPARATUS, COMPUTER DEVICE, AND COMPUTER-READABLE STORAGE MEDIUM

CROSS-REFERENCE TO RELATED APPLICATIONS

This application is a continuation application of PCT Patent Application No. PCT/CN2021/113175, entitled "IMAGE DETECTION METHOD AND APPARATUS, AND COMPUTER DEVICE AND COMPUTER-READABLE STORAGE MEDIUM" filed on Aug. 18, 2021, which claims priority to Chinese Patent Application No. 202011024483.0, filed with the State Intellectual Property Office of the People's Republic of China on Sep. 25, 2020, and entitled "IMAGE DETECTION METHOD AND APPARATUS, COMPUTER DEVICE, AND COMPUTER-READABLE STORAGE MEDIUM", all of which are incorporated herein by reference in their entirety.

FIELD OF THE TECHNOLOGY

This application relates to the field of communication technologies, and specifically, to an image detection method and apparatus, a computer device, and a computer-readable storage medium.

BACKGROUND OF THE DISCLOSURE

With the rapid development of interne technology, processing power of a computer device is also getting increasingly stronger, resulting in many applications based on human-machine interaction, such as a cloud game. A game console of the cloud game is on a server, and a player is connected to the server through the local network. When playing the game on the server, the server transmits a game picture through the network in real time for vivid interactive entertainment.

In the related art, during starting and playing of the cloud game, it is very likely that a case in which the game freezes occurs. The computer device can obtain a usage frequency of a central processing unit (CPU) in real time. When the usage frequency of the central processing unit is abnormal, it is determined that a case in which the game freezes occurs and corresponding game optimization processing is performed.

During the research and practice of the related art, the inventor of this application found that in the related art, because different scenes in the game have different consumptions on the CPU, it is difficult to accurately set a threshold for determining abnormality, resulting in relatively poor detection accuracy.

SUMMARY

Various embodiments of this application provide an image detection method and apparatus, a computer device, and a computer-readable storage medium. Various embodiments of this application include:

an image detection method, performed by a computer device, the method including:

intercepting a first image and a second image at a preset time interval from a video stream;

performing pixel matching on the first image and the second image to obtain a value of total matching pixels between the first image and the second image;

performing picture content detection on the second image in response to determining that the first image and the second image satisfy a preset matching condition based on the value of total matching pixels; and determining that the video stream is abnormal in response to detecting that no picture content is included in the second image.

An image detection apparatus includes:

an interception unit, configured to intercept a first image and a second image at a preset time interval from a video stream;

a matching unit, configured to perform pixel matching on the first image and the second image to obtain a value of total matching pixels between the first image and the second image;

a detection unit, configured to perform picture content detection on the second image in response to determining that the first image and the second image satisfy a preset matching condition based on the value of total matching pixels; and a determining unit, configured to determine that the video stream is abnormal in response to detecting that no picture content is included in the second image.

A computer device includes a memory, a processor, and a computer program stored on the memory and executable on the processor, the processor, when executing the program, implementing the steps in any of the image detection methods according to the embodiments of this application.

A non-transitory computer-readable storage medium stores a computer program, the computer program, when executed by a processor, implementing the steps in any of the image detection methods provided in the embodiments of this application.

A computer program product or a computer program is provided, the computer program product or the computer program including computer instructions, the computer instructions being stored in a computer-readable storage medium. A processor of a computer device reads the computer instructions from the computer-readable storage medium and executes the computer instructions to cause the computer device to implement the image detection method provided in the various embodiments described above.

DESCRIPTION OF EMBODIMENTS

Embodiments of this application provide an image detection method and apparatus, a computer device, and a computer-readable storage medium.

Figure 1:
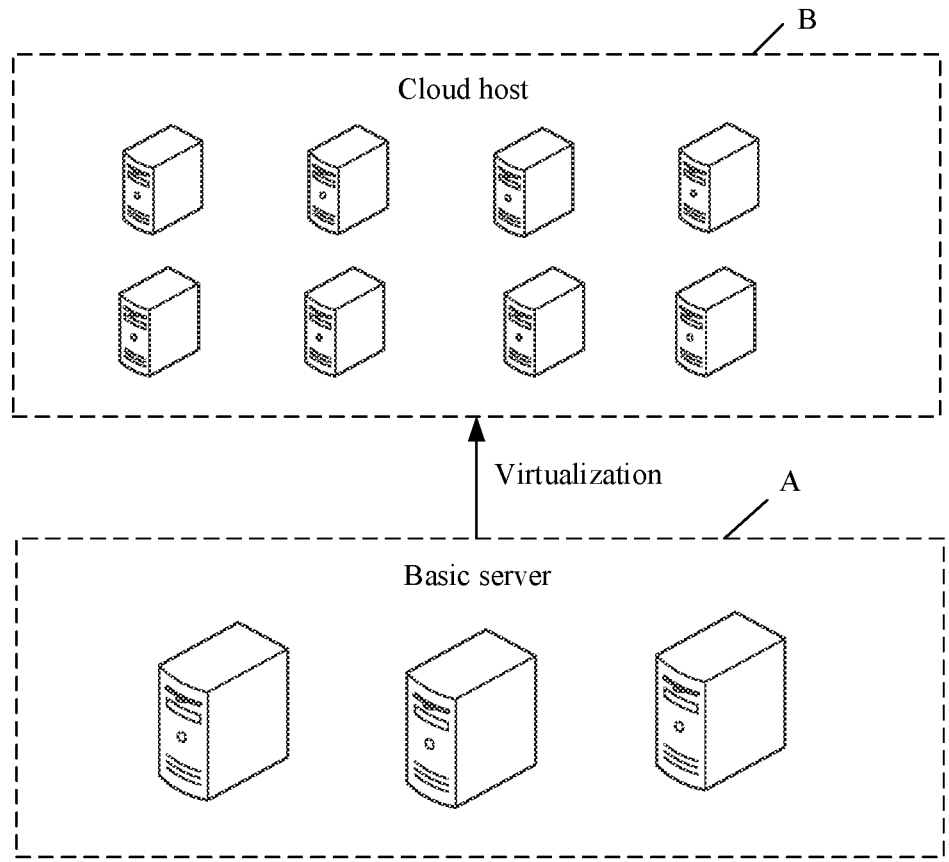
FIG. 1 is a schematic diagram of a scenario of an image detection system according to an embodiment of this application.

FIG. 1 is a schematic diagram of a scenario of an image detection system according to an embodiment of this application, including: a basic server A and a virtualized cloud host B (the basic server A and the virtualized cloud host B may further include more, and a specific quantity is not limited herein). The basic server A is a physical machine, and is also referred to as a physical server, which is a name of a physical computer relative to a virtual machine. A hardware environment provided by the physical machine to the virtual machine is also referred to as a "host". The basic server A may be an independent physical server, may also be a server cluster or distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a CDN, and a large data and AI platform. The basic server A is virtualized, so that each basic server A can virtualize the plurality of cloud hosts B. The cloud hosts B are virtual machines, and may also be referred to as virtual private servers (VPS), which is a technology for partitioning a server into a plurality of virtual independent dedicated servers. Each virtual independent server using VPS technology has an independent Internet Protocol (IP) address, an operating system, hard disk space, memory space, Central Processing Unit (CPU) resources, or the like, and can further perform operations such as installing a program, restarting the server, or the like, which is exactly the same as running an independent server. That is, a server is virtually divided at a software level, and a plurality of servers are virtualized, so that a user who only needs a little computing power can enjoy computing resources of a large server. In a broad sense, the cloud host B is the VPS, but the cloud host B further virtualizes all basic resources, such as memory bandwidth, or the like, on all the basic servers A or the virtual machines. An advantage of the cloud host B is that the cloud host B can store data in a distributed manner and dynamically expand the basic resources. In addition, the cloud host B has relatively strong security and scalability.

Each cloud host B has an independent operating system and hardware structure, which is exactly the same as running an independent host, except that a physical address in each cloud host B is a physical address of the virtual machine. Each cloud host B can be installed with a plurality of processors, for example, a cloud host B is installed with a plurality of graphics processing units (GPU). A cloud host B can be similar to a VMware virtual machine, and a physical machine can virtualize a plurality of instances of an Android operating system. A board or a container of a game can be installed in the cloud host B to simulate a terminal environment of the user, but there is no physical display screen.

Figure 2:
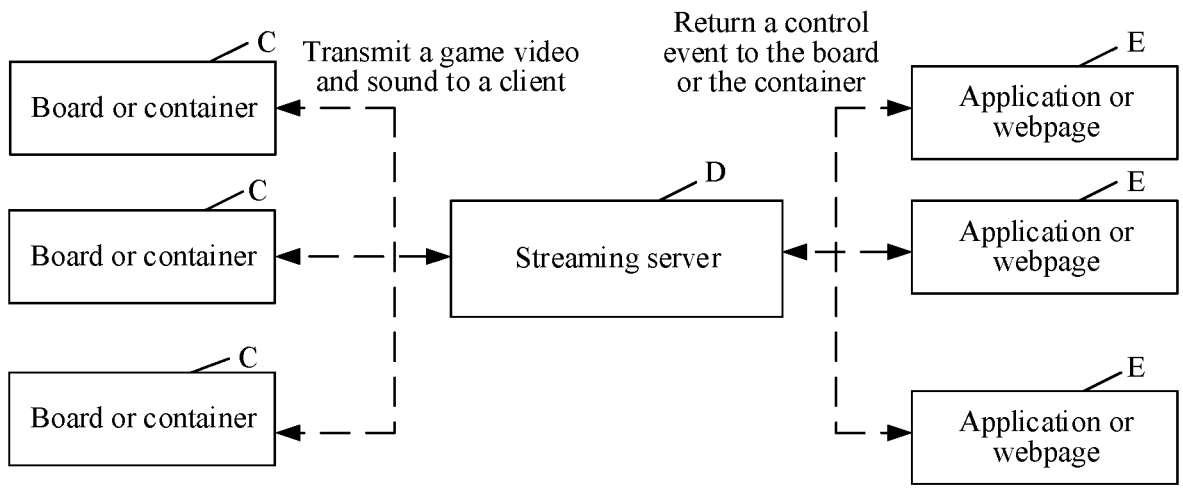
FIG. 2 is another schematic diagram of a scenario of an image detection system according to an embodiment of this application.

To better describe this embodiment of this application, reference may be made to FIG. 2 together. A running environment of the game can be installed on a board of a cloud host B or a container C. The board or the container C is similar to a terminal of the user, but there is no physical display screen for picture display. The board or the container C has a streaming process in which a game video and sound are pushed to the terminal through a streaming server D. The terminal may be a smart phone, a tablet computer, a notebook computer, a desktop computer, a smart speaker, a smart watch, or the like, but is not limited thereto. The terminal and the server may be directly or indirectly connected in a wired or wireless communication manner. This is not limited in this application. The terminal can install and open an application or a webpage E, and receive the game video and the sound through the application or the webpage E for loading. In an implementation, the user can input a control event on the terminal to control actions of a virtual game character in the video. The terminal returns the control event to the board of the cloud host B or the container C to implement game control.

In this way, when the board in the cloud host B or the game video in the container C freezes, display of the terminal side is affected, which causes the user to fail to operate and the game to fail to be played. Therefore, whether the video of the game is abnormal needs to be effectively monitored in real time, so as to implement timely processing and prevent the game from crashing.

Based on descriptions of the foregoing application scenarios, detailed descriptions are separately made below. Sequence numbers of the following embodiments are not intended to limit preference orders of the embodiments.

This embodiment is described from the perspective of the image detection apparatus, and the image detection apparatus may be specifically integrated in a server. The server may be implemented by using an independent server or a server cluster that includes a plurality of servers. Specifically, the server may be a cloud host or a physical server that has a storage unit and has a computing capability due to an installed microprocessor.

Figure 3:
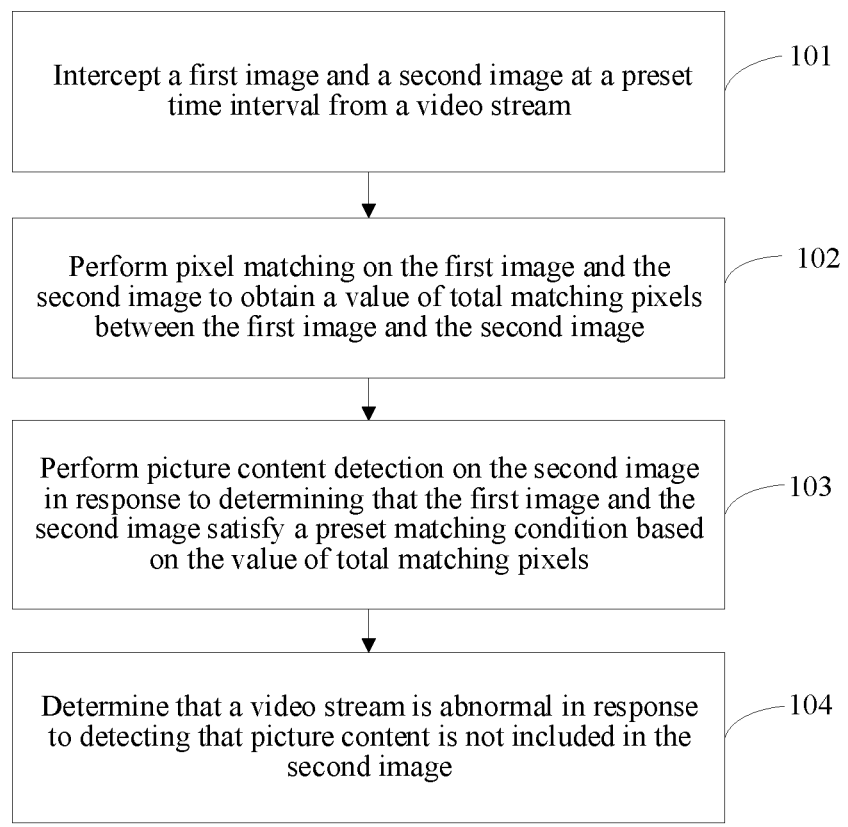
FIG. 3 is a schematic flowchart of an image detection method according to an embodiment of this application.

FIG. 3 is a schematic flowchart of an image detection method according to an embodiment of this application. The image detection method includes:

Step 101. Intercept a first image and a second image at a preset time interval from a video stream.

The video stream can include a plurality of frames of game images, that is, the video stream can be a game picture. It is to be understood that, in the related art, due to a large load of game picture rendering or the incompatibility of some components of the cloud host with the running of the game, the game freezes when the game starts or during playing the game, and when the game freezes, it is difficult to determine whether the game really freezes just by visual observation of the image.

In this way, in this embodiment of this application, the first image and the second image can be periodically intercepted at a preset time interval from the video stream of the game through the server. The preset time period can be freely set as required, such as 10 seconds, 20 seconds, or 30 seconds, which is not specifically limited herein. For example, during running of the video stream of the game, the first image of the current frame is intercepted, and the second image of the 10th second frame is intercepted during the past 10 seconds of running. The quantity of pixels of the first image and the quantity of pixels of the second image are the same, and the pixels refer to small squares of the image. The small squares have definite positions and assigned color values. Colors and positions of the small squares determine the appearance of the image that is presented, and the pixels can be regarded as an indivisible unit or element in the entire image. Each image includes a specific quantity of pixels, and the pixels determine a size of the image presented on the screen.

Step 102. Perform pixel matching on the first image and the second image to obtain a value of total matching pixels between the first image and the second image.

To determine whether the game picture corresponding to the video stream of the game is static, the pixel matching needs to be performed between the first image and the second image at an interval of a preset time period. Because the first image and the second image have the same quantity of pixels, the similarity between the pixels in the first image and the pixels at a corresponding position in the second image can be calculated through the server. For example, the similarity between two pixels with the same position in the first image and the second image is calculated, and all the similarities are integrated to obtain a similarity score value. The similarity score value is the value of total matching pixels the value of total matching pixels between the first image and the second image, and the similarity score value reflects a degree of similarity between the first image and the second image. Whether the first image and the second image satisfy a preset matching condition can be determined according to the similarity score value, that is, it can be determined whether the game picture is static.

In one of the embodiments, the server may calculate the value of total matching pixels the value of total matching pixels between the first image and the second image through a square difference matching algorithm. The corresponding square difference matching algorithm can be determined based on a template matching principle. By using the template matching principle, the most similar region to a template image in a pair of to-be-matched images can be found. The method is simple in principle and fast in calculation, and can be applicable to a plurality of fields such as target recognition, target tracking, or the like.

The server can use the pixels in the first image as the template image, and use the pixels at the corresponding position in the second image as the to-be-matched image. For each one of the pixels in the plurality of pixels in the second image, the matching value between the current pixel in the second image and the pixels at the corresponding position in the first image is calculated based on the square difference matching algorithm. The matching value corresponding to the pixels between the first image and the second image is calculated to obtain the value of total matching pixels the value of total matching pixels between the first image and the second image. The total matching value reflects the degree of matching of the first image and the second image. When the value of total matching pixels is 0, the first image and the second image are exactly the same; and the greater the value of total matching pixels, the less similar the first image and the second image are.

In one of the embodiments, the step of performing pixel matching on the first image and the second image to obtain a value of total matching pixels between the first image and the second image may include:

(1) identifying pixels of the second image corresponding to pixels of the first image based on their respective locations to obtain a covered second target image; and (2) calculating a sum of squares of differences between the pixels of the first image and corresponding pixels of the second target image to obtain the value of total matching pixels the value of total matching pixels between the first image and the second image.

The total matching value of the pixels between the first image and the second image can be determined through the square difference matching algorithm, and the square difference matching algorithm is:

$$R(x, y) = \sum_{x', y'} (T(x', y') - I(x+x', y+y'))^2$$

The T (x', y') is a template image matrix, and in this embodiment of this application, the template image matrix is a matrix formed by the pixels in the first image with the first image used as the template image, I(x, y) is a source image matrix, and the source image matrix is a matrix formed by the pixels in the second image. I(x+x', y+y') is a matrix formed by the pixels of the covered second target image obtained by covering the pixels of the first image on the pixels of the second image. In this step, the R (x, y) is the value of total matching pixels.

In this way, based on the foregoing formula, the server can ' the sum of the squares of the difference between the pixels of each image and the pixels at the corresponding position of the second target image to obtain the total matching valueR(x, y) of the pixels. The closer the value of total matching pixels is to 0, the more similar the first image and the second image are; and the greater the value of total matching pixels, the less similar the first image and the second image are.

Step 103. Perform picture content detection on the second image in response to determining that the first image and the second image satisfy a preset matching condition based on the value of total matching pixels.

A preset matching condition can be set, and the preset matching condition can be a preset score threshold. The preset score threshold is a critical value that defines whether the first image and the second image are matched. That is, when the value of total matching pixels is greater than the preset score threshold, the server determines that the first image and the second image satisfy the preset matching condition, determines that a matching between the first image and the second image succeeds, that is, the similarity between the first image and the second image satisfies the condition, and determines that the game picture is static. When the value of total matching pixels is not greater than the preset score threshold, the server determines that the pixels between the first image and the second image do not satisfy the preset matching condition, determines that the matching between the first image and the second image fails, that is, the similarity between the first image and the second image does not satisfy the condition, and determines that the game picture still changes and does not freeze.

Further, when it is determined that the value of total matching pixels the value of total matching pixels between the first image and the second image satisfies the preset matching condition, it indicates that the game picture of the video stream at the preset time interval is static and unchanged, that is, the video stream of the game may freeze. Because there may be short-term static pictures in some game pictures, and the game pictures that freeze are usually images with solid colors or images with little change in brightness, to prevent misjudgment of the freezing, the server needs to further perform picture content detection on the second image.

If the images are all solid colors, or images with little change in brightness, that is, no picture content is included in the second image, the overall blurriness is bound to be less than a specific range. The range may be less than 1.5, and the picture content detection may be performing image blurriness detection on the second image.

In one of the embodiments, comprehensive detection can be performed on the image blurriness of the second image through the Laplace algorithm to implement the corresponding picture content detection. The Laplacian algorithm is used for edge detection of an image, and can be used for detection of changes in brightness in the image to determine the blurriness of the image.

In one of the embodiments, when the value of total matching pixels the value of total matching pixels between the first image and the second image does not satisfy the preset matching condition, it indicates that the game picture of the video stream at the preset time interval is not static and unchanged. It is possible to return to and continue to perform the step of intercepting the first image and the second image at a preset time interval from the video stream to continue to perform detection.

In one of the embodiments, the image detection method further includes the step of determining that the first image and the second image satisfy a preset matching condition based on the value of total matching pixels, where based on the value of total matching pixels, the step of determining that the first image and the second image satisfy the preset matching condition may include:

(1) performing normalization processing on the value of total matching pixels to obtain a matching value after the normalization processing;

(2) converting the matching value after the normalization processing to a score value; and (3) determining that the first image and the second image satisfy a preset matching condition in response to detecting that the score value is greater than a preset score threshold.

To prevent a range of the value of total matching pixels from being relatively large, which is not conducive to determine whether the first image and the second image are matched by using a standard score, in this embodiment of this application, the normalization processing is used to scale the total matching value to be between 0 and 1. The closer the matching value after the normalization processing is to 0, the more similar the first image and the second image are, and the closer the matching value after the normalization processing is to 1, the less similar the first image and the second image are.

In an actual use process, to better determine the similarity between the two, the matching value after the normalization processing can be converted into a score value. The closer the matching value is to 0, the higher the score. The closer the matching value is to 1, the lower the score. The degree of matching can be defined by the preset score threshold. When detecting that the score value is greater than the preset score threshold, the server determines that the first image and the second image satisfy a preset matching condition, and a matching between the first image and the second image succeeds. When detecting that the score value is less than or equal to the preset score threshold, the server determines that the first image and the second image do not satisfy the preset matching condition, and a matching between the first image and the second image fails.

In one of the embodiments, the step of performing normalization processing on the value of total matching pixels to obtain a matching value after the normalization processing may include:

(2.1) calculating a sum of products of the pixels of the first image and corresponding pixels of a second target image;

(2.2) performing quadratic radical calculation on the sum of the products that is calculated to obtain a target value; and (2.3) calculating a ratio of the value of total matching pixels to the target value to obtain the matching value after the normalization processing.

The normalization processing can be performed on the value of total matching pixels by the following formula to obtain the matching value after the normalization processing, and the formula can specifically be a normalized square difference matching method:

$$R(x, y) = \frac{\sum_{x',y'} (T(x', y') - I(x+x', y+y'))^2}{\sqrt{\sum_{x',y'} \left(T(x', y')^2 * \sum_{x',y'} I(x+x', y+y')\right)^2}}$$

The T (x', y') is a template image matrix, and in this embodiment of this application, the template image matrix is a matrix formed by the pixels in the first image with the first image used as the template image, I(x, y) is a source image matrix, and the source image matrix is a matrix formed by the pixels in the second image. I (x+x', y+y') is a matrix formed by the pixels of the covered second target image obtained by covering the pixels of the first image on the pixels of the second image. In this step, the R (x, y) is the matching value after the normalization processing.

In this way, based on a denominator part of the foregoing formula, the sum of the products of the pixels of the first image and the corresponding pixels of the second target image is calculated. Quadratic radical calculation (that is, performing calculation by extracting square roots) is performed on the sum of the calculated products to obtain a target value. A numerator of the foregoing formula is the value of total matching pixels, and a ratio of the value of total matching pixels of the numerator to the target value of the denominator is calculated to obtain the matching value after the normalization processing, thereby scaling the matching value to be between 0 and 1. The closer the matching value after the normalization processing is to 0, the more similar the first image and the second image are, and the closer the matching value after the normalization processing is to 1, the less similar the first image and the second image are.

In one of the embodiments, the step of converting the matching value after the normalization processing to a score value may include:

(3.1) calculating differences between a preset base value and the matching value after the normalization processing; and (3.2) multiplying the difference by a preset amplification threshold to obtain the score value.

Because the matching value after the normalization processing is between 0 and 1, and a threshold needs to be set later, and the part close to 0 is not conducive to performing determining by setting the threshold, the preset base value can be set to 1. Differences between the preset base value and the matching value after the normalization processing is calculated, so that a determining rule is adjusted inversely, and a matching succeeds when the matching value is close to 1, and a matching fails when the matching value is close to 0, which is more conducive to performing determining by the manually set the threshold. The closer the difference is to 0, the less similar the first image and the second image are, and the closer the difference is to 1, the more similar the first image and the second image are.

Further, the difference is multiplied by the preset amplification threshold, for example, the preset amplification threshold may be 1000, so that 1000 is a maximum score. A preset score threshold may be set to 950, and when it is detected that the score value is greater than the preset score threshold, it is determined that the first image and the second image are detected to be matched.

In one of the embodiments, the step of performing picture content detection on the second image may include:

(4.1) performing filtering processing on a frame region of the second image to obtain an initial image target after the filtering processing;

(4.2) performing blur processing on the initial image target to obtain a final image target after the blur processing;

(4.3) calculating target blurriness of the final image target; and (4.4) determining that no picture content is included in the second image in response to detecting that the target blurriness is lower than a preset blurriness threshold.

Because there is often content such as a title in a frame region of the second image, to eliminate interference, filtering processing may be first performed on a frame region of the second image to obtain an initial image target after the filtering processing.

The server can perform Gaussian blur processing through data smoothing. It is to be understood that the calculated weight can be performed weighted processing on the corresponding pixel to implement smoothing of the image, where the weight can be an average value of surrounding pixels. In this way, the server can perform Gaussian blur processing on the initial image target, and perform smooth processing on the initial image target to obtain the final image target after the Gaussian blur processing, so that the subsequent blurriness calculation is more accurate.

Further, the server can calculate the target blurriness of the final image target. In an implementation, the server can calculate the target blurriness of the final image target through the Laplace algorithm. The lower the target blurriness, the lower the change rate of the pixels, which indicates that the higher the probability that no picture content is included in the second image. The higher the target blurriness, the higher the change rate of the pixels, which indicates that the lower the probability that no picture content is included in the second image.

A critical value that defines whether the picture content is included in the second image can be set as a preset blurriness threshold. The server determines that no picture content is detected to be included in the second image in response to detecting that the target blurriness is lower than the preset blurriness threshold.

In one of the embodiments, the step of calculating target blurriness of the final image target may include:

(5.1) performing calculation on the final image target through a Laplace algorithm to obtain a waveform data set;

(5.2) calculating an average value of the waveform data set, and obtaining a standard deviation corresponding to the waveform data set according to the average value; and (5.3) determining the standard deviation as target blurriness.

The server can obtain the waveform data set of a brightness value of the pixels in the final image target through a second-order differential in the Laplace algorithm. The waveform data with brighter pixels is negative, and the waveform data with darker pixels is positive.

Further, the server calculates an average value of the waveform data set, the standard deviation is an arithmetic square root of a variance, and the standard deviation can reflect a degree of dispersion of the waveform data set. The greater the standard deviation, the greater the difference between most of the data in the waveform data set and the average value, the smaller the standard deviation, the smaller the difference between most of the data in the waveform data set and the average value. In this way, the server can determine whether there is a relatively great change in the brightness of the pixels in the second image through the standard deviation. That is, the standard deviation corresponding to the waveform data set is obtained according to the average value, and the standard deviation is determined as the target blurriness.

Step 104. Determine that the video stream is abnormal in response to detecting that no picture content is included in the second image by the picture content detection.

When the server detects that no picture content is included in the second image, it indicates that a change of the overall brightness of the pixels in the second image is within a specific range. That is, it is determined that there is basically no change in the pixels in the second image, the picture has no content and has a solid color, and it is determined that the video stream is abnormal and the game freezes.

It can be seen from the above that in this embodiment of this application, a first image and a second image are intercepted at an preset time interval from a video stream; pixel matching is performed on the first image and the second image to obtain a value of total matching pixels between the first image and the second image; picture content detection is performed on the second image when the value of total matching pixels the value of total matching pixels between the first image and the second image satisfies a preset matching condition; and it is determined that the video stream is abnormal in response to detecting that no picture content is included in the second image. In this way, an image recognition manner can be used to perform detection on the image pictures of the video stream at the preset time interval. When it is detected that the image picture at the preset time interval remains unchanged, the picture content detection is performed on the second image. When no picture content is simultaneously included in the second image, it is determined that the video stream is abnormal. Compared with a solution in which in the related art, it is determined that a use frequency of the central processing unit is abnormal, a threshold for determining abnormality is difficult to accurately set, and the detection accuracy is relatively poor, in this embodiment of this application, based on the code design or log extraction that does not invade the game, the value of total matching pixels between images can be used to determine whether the video picture is static or not, and then content detection is performed on the static image to determine whether the video stream freezes. Various colors and brightness can be ensured, and inaccurate detection is not caused due to changes in picture brightness and color, which greatly improves the accuracy of image detection.

Further detailed descriptions are made below by using an example.

In this embodiment, the image detection apparatus is specifically integrated in a server, description is made by using an example in which the server is a cloud host, and for details, reference is made to the following description.

Figure 4:
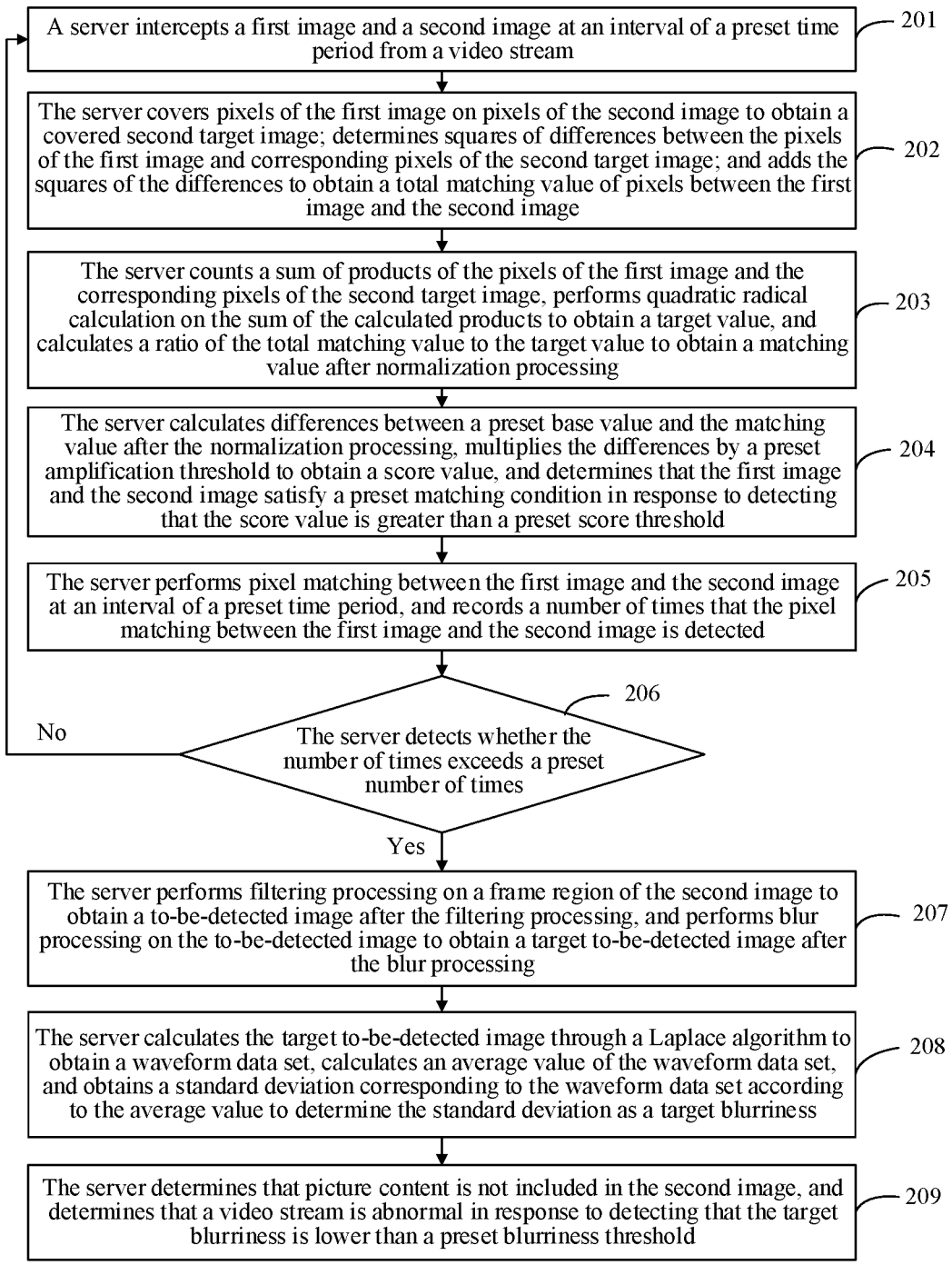
FIG. 4 is another schematic flowchart of an image detection method according to an embodiment of this application.

FIG. 4 is another schematic flowchart of an image detection method according to an embodiment of this application. The method process may include:

Step 201. The server intercepts a first image and a second image at a preset time interval from a video stream.

The video stream of this application can be a cloud game video stream. Because the game picture corresponding to the cloud game video stream is prone to a relatively large rendering load of the game picture or temporary incompatibility, the game freezes during starting or playing.

To prevent the user from waiting too long because the game freezes and is not repaired, in this embodiment of this application, the first game image and the second game image may be periodically intercepted from the video stream at an interval of 10 seconds through the server. The quantity of pixels of the first image and the quantity of pixels of the second image are the same.

Step 202. The server covers the pixels of the first image on the pixels of the second image to obtain the covered second target image, and calculates a sum of squares of differences between the pixels of the first image and corresponding pixels of the second target image to obtain the value of total matching pixels the value of total matching pixels between the first image and the second image.

The total matching value of the pixels between the first image and the second image can be determined by the following formula, and the formula can specifically be a square difference matching algorithm:

$$R(x, y) = \sum_{x', y'} (T(x', y') - I(x+x', y+y'))^2$$

The T (x', y') is a template image matrix, and in this embodiment of this application, the template image matrix is a matrix formed by the pixels in the first image with the first image used as the template image, I(x, y) is a source image matrix, and the source image matrix is a matrix formed by the pixels in the second image. I (x+x', y+y') is a matrix formed by the pixels of the covered second target image obtained by covering the pixels of the first image on the pixels of the second image. In this step, the R (x, y) is the value of total matching pixels.

In this way, the server covers the pixels of the first image on the pixels of the second image to obtain the covered second target image, and based on the foregoing formula, calculates the sum of the squares of the difference between the pixels of each image and the pixels at the corresponding position of the second target image to obtain the total matching value R (x, y) of the pixels. The closer the value of total matching pixels is to 0, the more similar the first image and the second image are. The greater the value of total matching pixels, the less similar the first image and the second image are.

Step 203. The server calculates the sum of the products of the pixels of the first image and the corresponding pixels of the second target image, performs quadratic radical calculation on the sum of the calculated products to obtain a target value, and calculates the ratio of the matching value to the target value to obtain the matching value after the normalization processing.

The normalization processing can be performed on the total matching value by the following formula, and the formula can specifically be a normalized square difference matching method:

$$R(x, y) = \frac{\sum_{x', y'} (T(x', y') - I(x+x', y+y'))^2}{\sqrt{\sum_{x', y'} \left( T(x', y')^2 * \sum_{x', y'} I(x+x', y+y') \right)^2}}$$

The T (x', y') is a template image matrix, and in this embodiment of this application, the template image matrix is a matrix formed by the pixels in the first image with the first image used as the template image, I(x, y) is a source image matrix, and the source image matrix is a matrix formed by the pixels in the second image. I (x+x', y+y') is a matrix formed by the pixels of the covered second target image obtained by covering the pixels of the first image on the pixels of the second image. In this step, the R (x, y) is the matching value after the normalization processing.

In this way, based on a denominator part of the foregoing formula, the sum of the products of the pixels of the first image and the corresponding pixels of the second target image are calculated. Quadratic radical calculation is performed on the sum of the calculated products to obtain a target value. A ratio of the value of total matching pixels of the numerator to the target value of the denominator is calculated to obtain the matching value after the normalization processing, thereby scaling the matching value to be between 0 and 1. The closer the matching value after the normalization processing is to 0, the more similar the first image and the second image are, and the closer the matching value after the normalization processing is to 1, the less similar the first image and the second image are.

Step 204. The server calculates the difference between the preset base value and the matching value after the normalization processing, multiplies the difference by the preset amplification threshold to obtain the score value, and determines that the first image and the second image satisfy a preset matching condition in response to detecting that the score value is greater than a preset score threshold.

The preset base value can be 1. The server calculates differences of the preset base value 1 minus the matching value after the normalization processing, so that a determining rule is adjusted inversely after the normalization processing. The closer the difference is to 0, the less similar the first image and the second image are, and the closer the difference is to 1, the more similar the first image and the second image are.

Therefore, to facilitate manually setting the threshold to perform determining, the preset amplification threshold can be set to 1000. The difference is multiplied by the preset amplification threshold 1000 to obtain a range of a score value being between 0 and 1000. When the score value is equal to 1000, it indicates that the first image and the second image are exactly the same. In an actual use scenario, a preset score threshold may be set to 950, and when it is detected that the score value is greater than the preset score threshold, it is determined that the first image and the second image are detected to be matched, and it is determined that the first image and the second image satisfy a preset matching condition. When it is detected that the score value is not greater than the preset score threshold, it indicates that the first image and the second image change. The game video stream runs normally, and the step of intercepting the first image and the second image at a preset time interval from the video stream through the server can be returned to and performed to continue to perform detection.

Step 205: The server performs pixel matching between the first image and the second image at an interval of a preset time period, and records the number of times that the pixel matching between the first image and the second image is detected.

A case of short-time loading may occur in some game video streams, such as 12 seconds of loading time. To prevent the case of short-time loading from being mistakenly determined as the game video stream freezing, the server performs pixel matching at an interval of a preset time period, and records the number of times that a matching between the first image and the second image succeeds. A condition for a matching that succeeds may be: the first image and the second image at an interval of 10 seconds satisfying the preset matching condition. When the first image and the second image satisfy the preset matching condition, it may be determined that a matching between the first image and the second image succeeds.

In step 206, the server detects whether the number of times exceeds a preset number of times.

The preset number of times is a defined value that defines that the game picture is really static, such as 3 times. When the server detects that the number of times exceeds the preset number of times, it indicates that neither the first image nor the second image changes within 30 seconds, the pictures are in a static state, and step 207 is performed. When the server detects that the number of times does not exceed the preset number of times, it indicates that the first image and the second image change within 30 seconds. The game video stream does not freeze, and step 201 is returned to and performed to continue to perform detection. Step 207. The server performs filtering processing on a frame region of the second image to obtain an initial image target after the filtering processing, and performs blur processing on the initial image target to obtain a final image target after the blur processing.

Figure 5A:
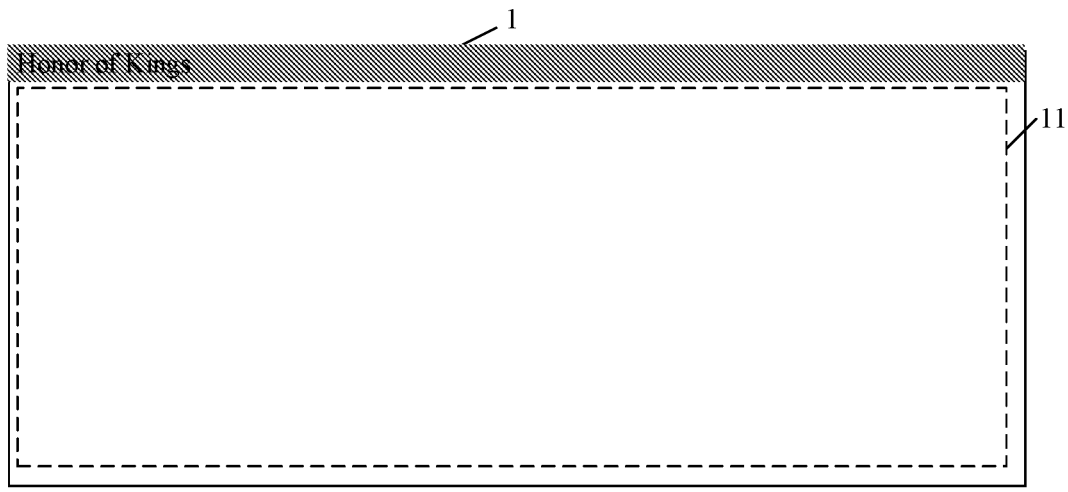
FIG. 5A is a schematic diagram of a scenario of an image detection method according to an embodiment of this application.

When the server detects that the number of times exceeds the preset number of times, it indicates that neither the first image nor the second image changes within 30 seconds, and the pictures are in a static state. That is, the game video stream may freeze. Because the game picture that freezes is usually an image with a solid color or an image with little change in brightness, to prevent misjudgment of the freezing, the second image needs to be further performed detection. The frame region of the second image can be performed filtering processing, and reference is made to FIG. 5A together. "Honor of Kings" is further included in a title bar on a frame of the second image 1. If the part is processed, a processing result is affected. In this way, the server can perform filtering processing on the frame region of the second image to obtain an initial image target 11 after the filtering processing.

Figure 5B:
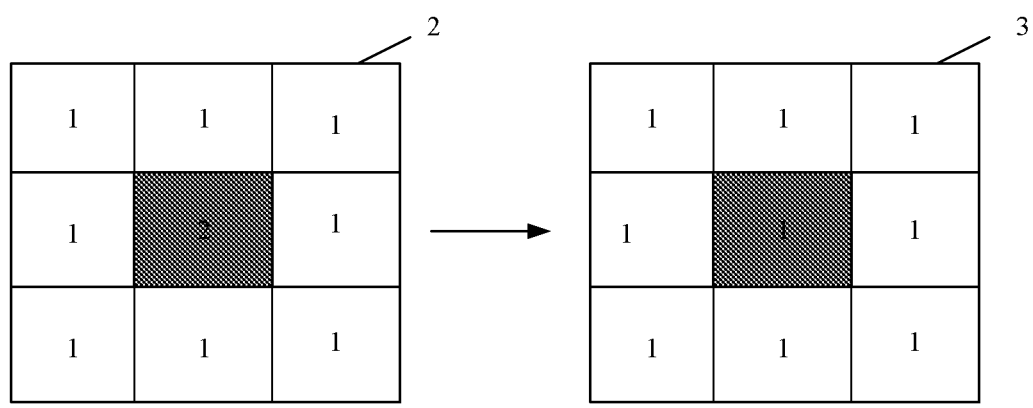
FIG. 5B is another schematic diagram of a scenario of an image detection method according to an embodiment of this application.

Further, Gaussian blur processing can be performed on the initial image target 11 to obtain a final image target after the Gaussian blur processing. To better explain the principle of the Gaussian blur processing, reference is made to FIG. 5B together. Assume that a RGB value of pixels at a center point of a partial region 2 of the initial image target 11 is 2, after the Gaussian blur processing, the RGB value of the pixels at the center point of a partial region 3 of the final image target after the Gaussian blur processing becomes 1 after referring to an average value of surrounding pixels, so that the pixels lose some details and image blur processing is implemented. The Gaussian blur processing has a key parameter ksize, which represents a blurring radius, and the greater the radius, the blurrier the effect of Gaussian blur processing. The blurring radius refers to a value of the quantity of surrounding pixels, and the blurring radius may be set to 1 in this embodiment of this application.

Step 208. The server calculates the final image target through the Laplace algorithm to obtain the waveform data set, calculates the average value of the waveform data set, and obtains the standard deviation corresponding to the waveform data set according to the average value to determine the standard deviation as the target blurriness.

The server can further perform grayscale processing on the final image target, and the grayscale refers to no color. RGB color components of the final image target are set to be equal to obtain a grayscale image, and a size of an operator of the Laplace algorithm is specified to be the same as the blurring radius. The grayscale image is calculated through the Laplace algorithm, and a waveform data set including waveform data of pixels in the grayscale image is obtained, and the waveform data can reflect the brightness of the pixels.

Further, the average value of the waveform data set can be calculated, and the corresponding standard deviation of the waveform data set can be obtained according to the average value. The standard deviation reflects how the waveform data in the waveform data set differs from the average value. The greater the standard deviation, the greater the difference between most of the data in the waveform data set and the average value. The smaller the standard deviation, the smaller the difference between most of the data in the waveform data set and the average value.

Step 209. The server determines that no picture content is included in the second image, and determines that the video stream is abnormal when detecting that the target blurriness is lower than the preset blurriness threshold.

The preset blurriness threshold is a critical value that defines whether the picture content is included in the second image. In this embodiment of this application, the preset blurriness threshold may be set to 1.5. When the server detects that the target blurriness is lower than the preset blurriness threshold, it indicates that the change rate of the brightness of the pixels in the second image is lower, and no picture content is included in the second image. In the picture with a solid color, it is determined that the game video stream is abnormal, the game freezes, and corresponding repair measures can be taken.

In some implementations, in this embodiment of this application, the second image determined to freeze may be uploaded to a convolutional neural network (CNN) model for learning. In this way, through continuous learning, the convolutional neural network can learn the capability to recognize the picture of the game video stream that freezes, and implement fast recognition.

In one of the embodiments, the first image and the second image are intercepted at an preset time interval from the video stream, including intercepting the first image and the second image at the preset time interval from the video stream at a current detection moment; before performing picture content detection on the second image, the method further includes: determining that a current matching result is a matching success in response to determining that the value of total matching pixels the value of total matching pixels between the first image and the second image corresponding to the current detection moment satisfies the preset matching condition based on the value of total matching pixels; obtaining a stored historical matching result, where the historical matching result is a matching result obtained by performing pixel matching processing on the first image and the second image that are intercepted at the preset time interval at a historical detection moment; and determining a number of times of successful matching within the preset detection time period based on the historical matching result and the current matching result; and the performing picture content detection on the second image in response to determining that a value of total matching pixels between the first image and the second image satisfies a preset matching condition based on the value of total matching pixels includes: performing picture content detection on the current second image when the number of times of successful matching within the preset detection time period is greater than or equal to the preset number of times.

A case of short-time loading may occur in some game video streams, such as 12 seconds of loading time. To prevent the case of short-time loading from being mistakenly determined as the game video stream freezing, the server performs pixel matching at an interval of a preset time period, and records the number of times that a matching between the first image and the second image succeeds. A condition for a matching that succeeds may be: the first image and the second image at an interval of 10 seconds satisfying the preset matching condition. When the first image and the second image satisfy the preset matching condition, it may be determined that a matching between the first image and the second image succeeds.

The server intercepts the first image and the second image at the preset time interval from the video stream at a current detection moment. The current detection moment refers to the current time point, and the first image and the second image are at an interval of a preset time period, for example, the first image and the second image are at an interval of 10 seconds. The server determines whether the value of total matching pixels the value of total matching pixels between the first image and the second image intercepted from the video stream at the current moment satisfies the preset matching condition by using the foregoing method, and obtains the stored historical matching result when it is determined that the preset matching condition is satisfied, that is, when it is determined that the current matching result is the matching success. The historical matching result is a matching result obtained by performing pixel matching processing on the first image and the second image that are intercepted at the preset time interval at a historical detection moment. The historical moment refers to a moment before the current moment.

It is easy to understand that the server intercepts the first image and the second image from the video stream at regular intervals, performs pixel matching processing on the first image and the second image to obtain a matching result, and stores the matching result in the memory, so that when it is determined that a matching between the first image and the second image that are intercepted at the current moment succeeds, the server can obtain the historical matching result within a preset detection time period from the memory. The preset detection time period refers to a preset time period using a current detection moment as an end. For example, the preset detection time period may include the first 30 seconds of the current detection moment.

The server determines a number of times of successful matching within the preset detection time period according to the historical matching result and the current matching result. The preset number of times is a defined value that defines that the game picture is really static, such as 3 times. When the server detects that the number of times is greater than or equal to the preset number of times, it indicates that neither the first image nor the second image changes within 30 seconds, the pictures are in a static state, and in this case, the server performs picture content detection on the current second image. The server may perform picture detection on the current second image by using the method for performing picture content detection on the second image in the foregoing embodiment.

When the server detects that the number of times is less than the preset number of times, it indicates that the first image and the second image change within 30 seconds, the game video stream does not freeze, and a next detection moment is entered. The next detection moment is used as a current moment, the step of intercepting the first image and the second image at the preset time interval from the video stream at the current detection moment is returned to, detection continues to be performed, and is stopped until playing of the video stream is finished.

In one of the embodiments, when the value of total matching pixels the value of total matching pixels between the first image and the second image intercepted from the video stream at the current moment does not satisfy the preset matching condition, the server returns to the step of intercepting the first image and the second image at a preset time interval from the video stream at a current detection moment to continue to perform detection.

It can be seen from the above that in this embodiment of this application, a first image and a second image are intercepted at an preset time interval from a video stream; pixel matching is performed on the first image and the second image to obtain a value of total matching pixels between the first image and the second image; picture content detection is performed on the second image when the value of total matching pixels the value of total matching pixels between the first image and the second image satisfies a preset matching condition; and it is determined that the video stream is abnormal in response to detecting that no picture content is included in the second image. In this way, an image recognition manner can be used to perform detection on the image pictures of the video stream at the preset time interval. When it is detected that the image picture at the preset time interval remains unchanged, the picture content detection is performed on the second image. When no picture content is simultaneously included in the second image, it is determined that the video stream is abnormal. Compared with a solution in which in the related art, it is determined that a use frequency of the central processing unit is abnormal, a threshold for determining abnormality is difficult to accurately set, and the detection accuracy is relatively poor, in this embodiment of this application, based on the code design or log extraction that does not invade the game, the value of total matching pixels between images can be used to determine whether the video picture is static or not, and then content detection is performed on the static image to determine whether the video stream freezes. Various colors and brightness can be ensured, and inaccurate detection is not caused due to changes in picture brightness and color, which greatly improves the accuracy of image detection.

To better implement the foregoing method, an embodiment of this application further provides an image detection apparatus. The apparatus may be integrated in a server. Terms have meanings the same as those in the foregoing image detection method. For specific implementation details, reference may be made to the description in the method embodiments.

Figure 6:
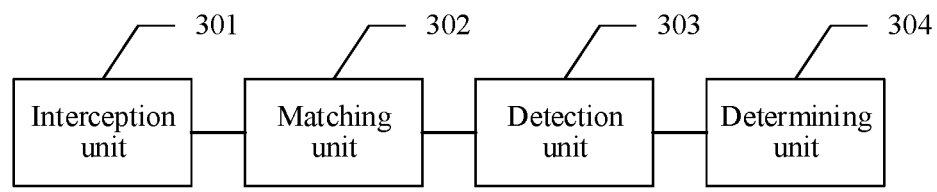
FIG. 6 is a schematic structural diagram of an image detection apparatus according to an embodiment of this application.

FIG. 6 is a schematic structural diagram of an image detection apparatus according to an embodiment of this application. The image detection apparatus may include an interception unit 301, a matching unit 302, a detection unit 303, a determining unit 304, or the like.

The interception unit 301 is configured to intercept a first image and a second image at a preset time interval from a video stream.

The matching unit 302 is configured to perform pixel matching on the first image and the second image to obtain a value of total matching pixels between the first image and the second image.

In one of the embodiments, the matching unit 302 includes:

a coverage subunit, configured to cover pixels of the first image on pixels of the second image to obtain a covered second target image; and a calculation subunit, configured to calculate a sum of squares of differences between the pixels of the first image and the corresponding pixels of the second target image to obtain the value of total matching pixels between the first image and the second image; and a detection unit 303, configured to perform picture content detection on the second image in response to determining that the first image and the second image satisfy a preset matching condition based on the value of total matching pixels.

In one of the embodiments, the detection unit 303 includes:

a normalization subunit, configured to perform normalization processing on the total matching value to obtain a matching value after the normalization processing;

a conversion subunit, configured to convert the matching value after the normalization processing to a score value; and a determining subunit, configured to determine that the first image and the second image satisfy a preset matching condition, and perform picture content detection on the second image in response to detecting that the score value is greater than a preset score threshold.

In one of the embodiments, the determining subunit is further configured to determine that the first image and the second image do not satisfy a preset matching condition in response to detecting that the score value is less than or equal to the preset score threshold.

In one of the embodiments, the normalization subunit is further configured to calculate a sum of products of the pixels of the first image and corresponding pixels of a second target image; perform quadratic radical calculation on the sum of the products that is calculated to obtain a target value; and calculate a ratio of the value of total matching pixels to the target value to obtain the matching value after the normalization processing.

In one of the embodiments, the conversion subunit is further configured to calculate differences between a preset base value and the matching value after the normalization processing; and multiply the difference by a preset amplification threshold to obtain the score value.

In one of the embodiments, the detection unit 303 includes:

a filtering subunit, configured to perform filtering processing on a frame region of the second image to obtain an initial image target after the filtering processing when the value of total matching pixels the value of total matching pixels between the first image and the second image satisfies the preset matching condition;

a processing subunit, configured to perform blur processing on the initial image target to obtain a final image target after the blur processing;

a calculation subunit, configured to calculate target blurriness of the final image target; and a determining subunit, configured to determine that no picture content is included in the second image in response to detecting that the target blurriness is lower than a preset blurriness threshold.

In one of the embodiments, the calculation subunit is further configured to calculate the final image target through a Laplace algorithm to obtain a waveform data set; calculate an average value of the waveform data set, and obtain a standard deviation corresponding to the waveform data set according to the average value; and determine the standard deviation as target blurriness.

The determining unit 304 is configured to determine that the video stream is abnormal in response to detecting that no picture content is included in the second image.

In one of the embodiments, the image detection apparatus may further include a recording unit, configured to: perform pixel matching between the first image and the second image at an interval of a preset time period; record the number of times that the pixel matching being performed between the first image and the second image is detected; perform the step of performing picture content detection on the second image when it is detected that the number of times exceeds the preset number of times; and return to and perform the step of intercepting the first image and the second image at an preset time interval from the video stream when it is detected that the number of times does not exceed the preset number of times.

In one of the embodiments, the image detection apparatus is further configured to intercept the first image and the second image at the preset time interval from the video stream at a current detection moment; determine that a current matching result is a matching success in response to determining that the value of total matching pixels the value of total matching pixels between the first image and the second image corresponding to the current detection moment satisfies the preset matching condition based on the value of total matching pixels; obtain a stored historical matching result, where the historical matching result is a matching result obtained by performing pixel matching processing on the first image and the second image that are intercepted at the preset time interval at a historical detection moment; and determine a number of times of successful matching within the preset detection time period based on the historical matching result and the current matching result; and perform picture content detection on the current second image when the number of times of successful matching within the preset detection time period is greater than or equal to a preset number of times.

In one of the embodiments, the image detection apparatus is further configured to enter, when the number of times of successful matching within the preset detection time period is less than the preset number of times, a next detection moment, use the next detection moment as a current moment, return to the step of intercepting the first image and the second image at the preset time interval from the video stream at the current detection moment, continue to perform detection, and stop until playing of the video stream is finished.

For specific implementation of the foregoing units, refer to the foregoing embodiments, which are not described repeatedly herein.

It can be seen from the above that in this embodiment of this application, the interception unit 301 intercepts a first image and a second image at an preset time interval from a video stream; the matching unit 302 performs pixel matching on the first image and the second image to obtain a value of total matching pixels between the first image and the second image; the detection unit 303 performs picture content detection on the second image when the value of total matching pixels the value of total matching pixels between the first image and the second image satisfies a preset matching condition; and the determining unit 304 determines that the video stream is abnormal in response to detecting that no picture content is included in the second image. In this way, an image recognition manner can be used to perform detection on the image pictures of the video stream at the preset time interval. When it is detected that the image picture at the preset time interval remains unchanged, the picture content detection is performed on the second image. When no picture content is simultaneously included in the second image, it is determined that the video stream is abnormal. Compared with a solution in which in the related art, it is determined that a use frequency of the central processing unit is abnormal, a threshold for determining abnormality is difficult to accurately set, and the detection accuracy is relatively poor, in this embodiment of this application, based on the code design or log extraction that does not invade the game, the value of total matching pixels between images can be used to determine whether the video picture is static or not, and then content detection is performed on the static image to determine whether the video stream freezes. Various colors and brightness can be ensured, and inaccurate detection is not caused due to changes in picture brightness and color, which greatly improves the accuracy of image detection.

Figure 7:
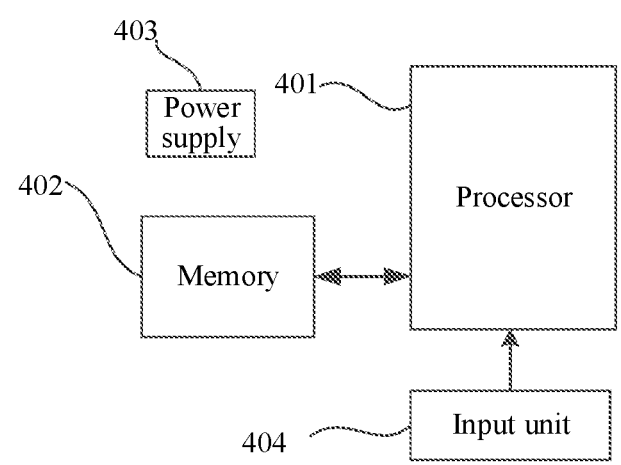
FIG. 7 is a schematic structural diagram of a server according to an embodiment of this application.

This embodiment of this application further provides a server. FIG. 7 is a schematic structural diagram of a server according to an embodiment of this application. Specifically, the server may be a cloud host, and may include components such as a processor 401 with one or more processing cores, a memory 402 with one or more computer-readable storage media, a power supply 403, and an input unit 404. A person skilled in the art may understand that the server structure shown in FIG. 7 does not constitute a limit to the server. The server may include more or fewer parts than those shown in the figure, may combine some parts, or may have different part arrangements.

The processor 401 is a control center of the server, and is connected to various parts of the entire server by using various interfaces and lines. By running or executing a software program and/or module stored in the memory 402, and invoking data stored in the memory 402, the processor 401 executes various functions of the server and performs data processing, thereby monitoring the entire server. In some embodiments, the processor 401 may include one or more processing cores. Preferably, the processor 401 may integrate an application processor and a modem, where the application processor mainly processes an operating system, a user interface, and an application program and the like, and the modem mainly processes wireless communication. It can be understood that the foregoing modem processor may alternatively not be integrated into the processor 401.

The memory 402 may be configured to store a software program and a module, and the processor 401 runs the software program and the module that are stored in the memory 402, to implement various functional applications and data processing. The memory 402 may mainly include a program storage area and a data storage area. The program storage area may store an operating system, an application program required by at least one function (for example, a sound playback function and an image display function), and the like. The data storage area may store data created according to use of the server, and the like. In addition, the memory 402 may include a high speed random access memory, and may further include a non-volatile memory, such as at least one magnetic disk storage device, a flash memory, or another volatile solid-state storage device. Correspondingly, the memory 402 may further include a memory controller, to provide access of the processor 401 to the memory 402.

The server further includes the power supply 403 for supplying power to the components. Preferably, the power supply 403 may be logically connected to the processor 401 by using a power management system, thereby implementing functions such as charging, discharging, and power consumption management by using the power management system. The power supply 403 may further include one or more direct current or alternating current power supplies, a re-charging system, a power failure detection circuit, a power supply converter or inverter, a power supply state indicator, and any other component.

The server may further include an input unit 404. The input unit 404 may be configured to receive inputted digit or character information, and generate a keyboard, mouse, joystick, optical or track ball signal input related to the user setting and function control.

Although not shown in the figure, the server may further include a display processor, and the like. Details are not described herein again. Specifically, in this embodiment, the processor 401 in the server may load executable files corresponding to processes of one or more applications to the memory 402 according to the following instructions, and the processor 401 runs an application stored in the memory 402, to implement various functions as follows:

intercepting a first image and a second image at an preset time interval from a video stream; performing pixel matching on the first image and the second image to obtain a value of total matching pixels between the first image and the second image; performing picture content detection on the second image in response to determining that the first image and the second image satisfy a preset matching condition based on the value of total matching pixels; and determining that the video stream is abnormal in response to detecting that no picture content is included in the second image.

In the foregoing embodiments, the descriptions of the embodiments have respective focuses. For a part that is not described in detail in an embodiment, refer to detailed description of the image detection method in the foregoing. Details are not described herein again.

It can be seen from the above that the server in this embodiment of this application can intercept a first image and a second image at an preset time interval from a video stream; perform pixel matching on the first image and the second image to obtain a value of total matching pixels between the first image and the second image; perform picture content detection on the second image when the value of total matching pixels the value of total matching pixels between the first image and the second image satisfies a preset matching condition; and determine that the video stream is abnormal in response to detecting that no picture content is included in the second image. In this way, an image recognition manner can be used to perform detection on the image pictures of the video stream at the preset time interval. When it is detected that the image picture at the preset time interval remains unchanged, the picture content detection is performed on the second image. When no picture content is simultaneously included in the second image, it is determined that the video stream is abnormal. Compared with a solution in which in the related art, it is determined that a use frequency of the central processing unit is abnormal, a threshold for determining abnormality is difficult to accurately set, and the detection accuracy is relatively poor, in this embodiment of this application, based on the code design or log extraction that does not invade the game, the value of total matching pixels between images can be used to determine whether the video picture is static or not, and then content detection is performed on the static image to determine whether the video stream freezes. Various colors and brightness can be ensured, and inaccurate detection is not caused due to changes in picture brightness and color, which greatly improves the accuracy of image detection.

In some embodiments, a computer device is provided, including a memory and one or more processors, the memory storing computer-readable instructions, the computer-readable instructions, when executed by the processors, causing the one or more processors to implement the steps of the processing method for call audio mixing. The steps in the processing method for call audio mixing may be the steps in the image detection method in the foregoing embodiments.

In some embodiments, one or more non-volatile readable storage media are provided, storing computer-readable instructions, the computer-readable instructions, when executed by one or more processors, causing the one or more processors to implement the steps of the image detection method. The steps in the image detection method may be the steps in the image detection method in the foregoing embodiments.

According to an aspect of this application, a computer program product or a computer program is provided, the computer program product or the computer program including computer instructions, the computer instructions being stored in a computer-readable storage medium. A processor of a computer device reads the computer instructions from the computer-readable storage medium, and executes the computer instructions, so that the computer device performs the method provided in the various implementations provided in the foregoing embodiments.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

For specific implementation of the foregoing operations, reference may be made to the foregoing embodiments. Details are not described herein again. The computer-readable storage medium may include: a read-only memory (ROM), a random access memory (RAM), a magnetic disk, an optical disc, or the like.

What is claimed is:

1. An image detection method, performed by a computer device, the method comprising:
   intercepting a first image and a second image at a preset time interval from a video stream;
   performing pixel matching on the first image and the second image to obtain a value of total matching pixels between the first image and the second image;
   in response to determining that the first image and the second image satisfies a preset matching condition based on the value of total matching pixels exceeding a first similarity threshold:
      identifying a subset of the second image as an initial image target;
      performing blur processing on the initial image target to obtain a final image target;
      calculating target blurriness of the final image target, wherein the target blurriness of the final image target is a standard deviation of pixels in the second image from an average of the pixels in the second image; and
   in response to determining that the target blurriness of the final image target is less than a second blurriness threshold. determining that the video stream is abnormal.

2. The image detection method according to claim 1, wherein the performing pixel matching on the first image and the second image to obtain a value of total matching pixels between the first image and the second image comprises:
   identifying pixels of the second image corresponding to pixels of the first image based on their respective locations to obtain a covered second target image; and
   calculating a sum of squares of differences between the pixels of the first image and the corresponding pixels of the second target image to obtain the value of total matching pixels the value of total matching pixels between the first image and the second image.

3. The image detection method according to claim 1, wherein the method further comprises:
   performing normalization processing on the value of total matching pixels to obtain a matching value after the normalization processing;
   converting the matching value after the normalization processing to a score value; and
   determining that the first image and the second image satisfy the preset matching condition in response to detecting that the score value is greater than a preset score threshold.

4. The image detection method according to claim 3, wherein the method further comprises:
   determining that the first image and the second image do not satisfy the preset matching condition in response to detecting that the score value is less than or equal to the preset score threshold.

5. The image detection method according to claim 3, wherein the performing normalization processing on the value of total matching pixels to obtain a matching value after the normalization processing comprises:
   calculating a sum of products of pixels of the first image and corresponding pixels of a second target image;
   performing quadratic radical calculation on the sum of the products that is calculated to obtain a target value; and
   calculating a ratio of the value of total matching pixels to the target value to obtain the matching value after the normalization processing.

6. The image detection method according to claim 3, wherein the converting the matching value after the normalization processing to a score value comprises:
   calculating differences between a preset base value and the matching value after the normalization processing; and
   multiplying the difference by a preset amplification threshold to obtain the score value.

7. The image detection method according to claim 1, wherein the calculating target blurriness of the final image target comprises:
   performing calculation on the final image target through a Laplace algorithm to obtain a waveform data set;
   calculating an average value of the waveform data set, and obtaining a standard deviation corresponding to the waveform data set according to the average value; and
   determining the standard deviation as the target blurriness.

8. The image detection method according to claim 1, wherein the intercepting a first image and a second image at an preset time interval from a video stream comprises:
- intercepting the first image and the second image at the preset time interval from the video stream at a current detection moment;
- before the performing picture content detection on the second image, the method further comprises:
- determining that a current matching result is a matching success in response to determining that the value of total matching pixels between the first image and the second image corresponding to the current detection moment satisfies the preset matching condition based on the value of total matching pixels;
- obtaining a stored historical matching result, wherein the historical matching result is a matching result obtained by performing pixel matching processing on the first image and the second image that are intercepted at the preset time interval at a historical detection moment; and
- determining a number of times of successful matching within a preset detection time period based on the historical matching result and the current matching result; and
- the performing picture content detection on the second image in response to determining that a value of total matching pixels between the first image and the second image satisfies a preset matching condition based on the value of total matching pixels comprises:
- performing picture content detection on a current second image when the number of times of successful matching within the preset detection time period is greater than or equal to a preset number of times.

9. The method according to claim 8, wherein the method further comprises:
- when the number of times of successful matching within the preset detection time period is less than the preset number of times, entering a next detection moment, using the next detection moment as a current moment, returning to the operation of intercepting the first image and the second image at the preset time interval from the video stream at a current detection moment to continue to perform detection, and stopping until playing of the video stream is finished.

10. A computer device, comprising a memory, a processor, and a computer program stored on the memory and executable on the processor, the processor, when executing the program, causing the computer device to implement an image detection method including:
- intercepting a first image and a second image at a preset time interval from a video stream;
- performing pixel matching on the first image and the second image to obtain a value of total matching pixels between the first image and the second image;
- in response to determining that the first image and the second image satisfies a preset matching condition based on the value of total matching pixels exceeding a first similarity threshold:
  - identifying a subset of the second image as an initial image target;
  - performing blur processing on the initial image target to obtain a final image target;
  - calculating target blurriness of the final image target, wherein the target blurriness of the final image target is a standard deviation of pixels in the second image from an average of the pixels in the second image; and
  - in response to determining that the target blurriness of the final image target is less than a second blurriness threshold. determining that the video stream is abnormal.

11. The computer device according to claim 10, wherein the performing pixel matching on the first image and the second image to obtain a value of total matching pixels between the first image and the second image comprises:
- identifying pixels of the second image corresponding to pixels of the first image based on their respective locations to obtain a covered second target image; and
- calculating a sum of squares of differences between the pixels of the first image and the corresponding pixels of the second target image to obtain the value of total matching pixels between the first image and the second image.

12. The computer device according to claim 10, wherein the method further comprises:
- performing normalization processing on the value of total matching pixels to obtain a matching value after the normalization processing;
- converting the matching value after the normalization processing to a score value; and
- determining that the first image and the second image satisfy the preset matching condition in response to detecting that the score value is greater than a preset score threshold.

13. The computer device according to claim 12, wherein the method further comprises:
- determining that the first image and the second image do not satisfy the preset matching condition in response to detecting that the score value is less than or equal to the preset score threshold.

14. The computer device according to claim 12, wherein the performing normalization processing on the value of total matching pixels to obtain a matching value after the normalization processing comprises:
- calculating a sum of products of pixels of the first image and corresponding pixels of a second target image;
- performing quadratic radical calculation on the sum of the products that is calculated to obtain a target value; and
- calculating a ratio of the value of total matching pixels to the target value to obtain the matching value after the normalization processing.

15. The computer device according to claim 12, wherein the converting the matching value after the normalization processing to a score value comprises:
- calculating differences between a preset base value and the matching value after the normalization processing; and
- multiplying the difference by a preset amplification threshold to obtain the score value.

16. The computer device according to claim 10, wherein the calculating target blurriness of the final image target comprises:
- performing calculation on the final image target through a Laplace algorithm to obtain a waveform data set;
- calculating an average value of the waveform data set, and obtaining a standard deviation corresponding to the waveform data set according to the average value; and
- determining the standard deviation as the target blurriness.

17. One or more non-transitory computer-readable storage media storing computer-readable instructions, the computer-readable instructions, when executed by one or more processors of a computer device, causing the computer device to implement an image detection method including:

intercepting a first image and a second image at a preset time interval from a video stream;

performing pixel matching on the first image and the second image to obtain a value of total matching pixels between the first image and the second image;

in response to determining that the first image and the second image satisfies a preset matching condition based on the value of total matching pixels exceeding a first similarity threshold:

identifying a subset of the second image as an initial image target;

performing blur processing on the initial image target to obtain a final image target:

calculating target blurriness of the final image target, wherein the target blurriness of the final image target is a standard deviation of pixels in the second image from an average of the pixels in the second image; and in response to determining that the target blurriness of the final image target is less than a second blurriness threshold, determining that the video stream is abnormal.

18. The non-transitory computer-readable storage media according to claim 17, wherein the performing pixel matching on the first image and the second image to obtain a value of total matching pixels between the first image and the second image comprises:

identifying pixels of the second image corresponding to pixels of the first image based on their respective locations to obtain a covered second target image; and calculating a sum of squares of differences between the pixels of the first image and the corresponding pixels of the second target image to obtain the value of total matching pixels between the first image and the second image.

19. The non-transitory computer-readable storage media according to claim 17, wherein the method further comprises:

performing normalization processing on the value of total matching pixels to obtain a matching value after the normalization processing;

converting the matching value after the normalization processing to a score value; and determining that the first image and the second image satisfy the preset matching condition in response to detecting that the score value is greater than a preset score threshold.

20. The non-transitory computer-readable storage media according to claim 17, wherein the calculating target blurriness of the final image target comprises:

performing calculation on the final image target through a Laplace algorithm to obtain a waveform data set;

calculating an average value of the waveform data set, and obtaining a standard deviation corresponding to the waveform data set according to the average value; and determining the standard deviation as the target blurriness.

* * * * *